April 8, 1952     D. S. FERNANDES     2,592,407
METHOD OF PROCESSING RICE FOR PRESERVING
THE VITAMIN CONTENTS THEREOF
Filed March 29, 1950

*INVENTOR.*
Daniel Salomon FERNANDES
BY
Attorney

Patented Apr. 8, 1952

2,592,407

UNITED STATES PATENT OFFICE 2,592,407

METHOD OF PROCESSING RICE FOR PRESERVING THE VITAMIN CONTENTS THEREOF

Daniel S. Fernandes, Paramaribo, Surinam, Dutch West Indies

Application March 29, 1950, Serial No. 152,709
In the Netherlands September 9, 1948

5 Claims. (Cl. 99—11)

This is a continuation in part of my application Serial Number 88,946, filed on April 22, 1949.

The invention relates to a new method of processing rice. More particularly it is an object of the invention to prepare, boil in part, or parboil rice in such a manner that the vitamins originally present in rough rice—paddy—or rice in the husk, and more particularly the vitamins $B_1$ also called thiamine or aneurine, are fully retained, up to 100%, in the white kernels after the husks had been removed and the rice had been polished or even milled.

More specifically it is an object of the invention to carry out this processing of the rice in such a way that the vitamins of the rice kernels located in the silver-coat, the outer cell layers and the germ are transferred or diffused without noticeable loss into the kernel and secured or fixed therein by gelatinization of the starch contained in the kernel.

The inventor has made the important discovery that this end may be achieved when during the processing of the rough rice—paddy—the following steps are taken:

(1) Throughout the processing of the rice the surfaces of the individual rice grains are rendered and maintained readily and uniformly accessible to treatment;

(2) The heat supplied to the process is uniformly and moderately applied to the grains;

(3) Water which during any spraying or steaming process, or both, is applied to the rice in either fluid condition, as liquid or as steam, or in both forms, is caused to permeate the kernels of the rice only gradually until the saturation point of the kernels is reached, however this saturation is effected be it by applying to the rice water in its liquid form, or as the condensate of steam, alone or in combination;

(4) During this permeation process, through which the vitamins contained in the silver-coat, the outer cell layers, and the germ of the rice are conveyed into and diffused within the kernels of the rice and simultaneously or immediately thereafter are fixed therein through gelatinization of the starch in the kernels, water, which for these purposes, permeating and gelatinizing, is supplied to the process either as water, or as steam, or as condensate, is supplied in a quantity at most in slight excess of the quantity taken up by the kernels.

Any risk is thus avoided that water in its liquid condition might escape out of the kernels and take with it vitamins, particularly vitamin $B_1$ which is soluble in water. Transport of the vitamins thus can take place only in the direction from the silver-coat, outer cell or protein layers and the germ into the interior of the kernel where they will be evenly distributed. No transport will take place from these vitamin containing zones to the outside;

(5) The rice, thereon, is dried at substantially atmospheric pressure and moderate temperature while the surfaces of the individual rice grains are rendered and maintained, or still maintained, readily and uniformly accessible to treatment. Drying under these conditions is continued until the original weight of the rice is substantially reached.

The method by means of which the preserving and fixing of the vitamin contents in the rice kernels is achieved in accordance with the invention, will as a rule be a continuous process.

This process, where the rough rice is treated spread out in a thin layer and where a slowly progressing and rolling motion is imparted to the grains of the rice and is maintained throughout the various steps of the process, may be executed economically on a small as well as on a large production scale. In both cases regular and complete supervision is possible.

The method of the invention, furthermore, makes it possible to maintain easily the temperatures of the process at the correct values and perfectly uniform and at a constant level so as to preserve fully the vitamin contents in the rice.

The method of the invention, moreover, renders needless the otherwise expensive use of high steam pressure on the one hand, and, on the other hand, of vacuum or both.

In the conventional three phases for parboiling rice, viz. soaking, steaming, and drying, where in the first two phases the rice is treated in bulk in open or closed vessels, it is of course impossible to make the surfaces of the individual rice grains uniformly accessible to the treatment. In the soaking period back flow of the water out of the grains, and thus an essential loss of vitamins is unavoidable. On the other hand, in the closed steaming vessel it is rather difficult, if the pressure and thus the temperature are not high, i. e. well above atmospheric pressure and above 100° C., to gelatinize the kernels evenly throughout the bulk of the material. The steaming vessel will thus be a second source of essential vitamin losses, vitamins destroyed by the high temperature of the steaming.

Contrariwise, through the method of the invention, back flow of water out of the kernels is avoided under any circumstances. The kernels are evenly permeated with water and gelatinized without any detrimental effect on the vitamin contents. Each individual grain may be subjected uniformly to a clearly defined, accurately controllable and constant temperature.

The rice in its natural, or rough form, after having been shortly washed to remove dust, dirt, or other impurities, is spread in a thin layer which is moved in such a way that a slowly progressing and rolling motion is imparted to the rice grains and the surfaces of the individual grains are thus rendered and maintained fully and uniformly accessible to the treatment.

When the rice is to be parboiled in three steps, viz. wet treatment, steaming, and drying, the three steps may be executed in three vessels, open drums. It is also possible to execute the first two steps or all three steps in a correspondingly long vessel wherein the two or three operations are performed in succession.

It is also possible to permeate the rice with moisture of such a temperature to gelatinize its starch contents merely by appropriate wet treatment alone or also by steam treatment alone.

The wet treatment of the rough rice is carried out in continuous operation by spraying with water the rice spread in a thin layer and conveyed along the apparatus with a slow progressive motion in which the rice grains are simultaneously rolled about. The rice kernels of the layer thus will each execute the same movement and each will present during this passage through the apparatus all parts of its surface evenly to all exterior agents.

For most rice varieties, the elevated temperature not reaching 100° C., will be between 75° and 90° C. The rice is thus permeated with water and this permeating step is continued until the rice has taken up the desired quantity of water.

As a rule, rough rice when about to be processed will have taken up a moisture contents of approximately 15% of its weight in dry condition. During the parboiling process, this moisture contents is to be increased to the saturation point of the rice at the temperature it reaches in the processing, namely about 80° to 85° C. At this temperature the rice may take up in total a quantity of water corresponding to 55% of its original dry weight in order to be saturated.

Since unsaturated rice may take up water also during the steaming step, the difference of 40% with which the rice is to be permeated in total during the processing may be distributed arbitrarily between the two steps, wet treatment or spraying with water and steaming.

The process thus may conveniently be directed that an equal amount of moisture, about 20% by weight of the dry rice, will be taken up in each step. However, any other relation is also possible. In the limit cases, the rice may be permeated with the whole quantity of hot water, in the present example 40%, in the spraying step, so that the steaming step may be dispensed with, or, in the other case, in the steaming step, so that the spraying step or wet treatment becomes redundant.

In order to avoid any adverse effect which might occur through non-uniform heating of the individual grains when directly hit by the steam, the steaming of the rice, in the method of the invention is performed in a steam atmosphere such that the grains are protected from, and not subjected to, the direct impact of the steam, while the steam in this atmosphere is allowed to condense. The grains are brought into contact with the condensate. The kernels are thus permeated or further permeated with hot moisture up to their point of saturation whereas simultaneously the starch in the rice kernels is completely gelatinized and the vitamins thus fixed in the kernels.

When the steaming step is conducted in the manner thus described, the kernels will not burst but will be swollen to their maximum size. The husks will show a split and the grains may then be withdrawn from this step with the kernels wholly intact, of translucent aspect and elastically flexible.

Since the vitamins do not evaporate, particularly not vitamin $B_1$, in the ensuing drying process, the water contained in the kernels may be evaporated without any adverse effect on the vitamins, which are now sealed in the kernels, provided the drying temperature is moderate. Furthermore the water contained in the kernels may be evaporated without any harm to the physical constitution of the kernels when the drying is effected without any substantial change of pressure, thus substantially at atmospheric pressure.

The rice grains may thus be brought back to their original weight and water contents without any harmful shrinkage or without otherwise being damaged, by bursting or getting brittle, or otherwise.

The drying, thus, is effected by means of an air current without any substantial pressure and controllable as to its quantity and temperature.

In the drawings annexed to this specification and forming part thereof, I have illustrated by way of example an apparatus for carrying out the method of the invention.

This apparatus has been more fully described and claimed in my U. S. Patent No. 2,571,555.

In the drawings:

Fig. 2 illustrates as a second station, likewise in a diagrammatic longitudinal section, an apparatus for the steaming of the rough rice, whereas

Figure 1:
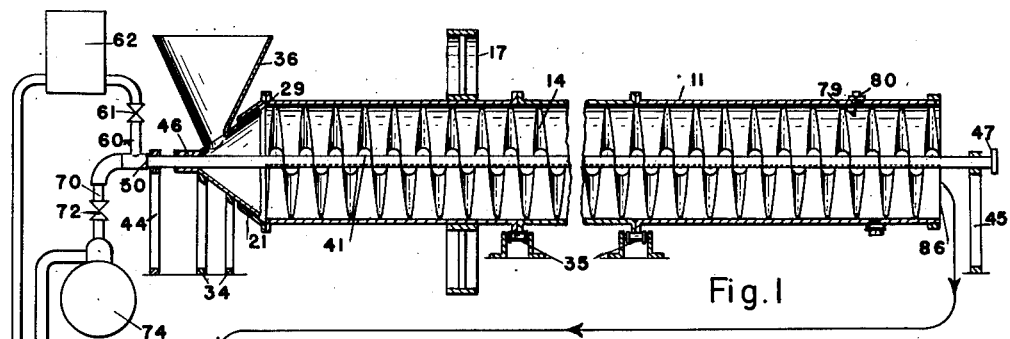
Fig. 1 is a, more or less, diagrammatic longitudinal section through an apparatus for the wet treatment of the rough rice, forming a first station for the carrying out of the process of the invention.

The three stations, as illustrated, comprise apparatus similar to one another. Each includes a horizontal rotatable drum 11, 12 and 13, respectively. The walls of the drums 11 and 12 are impermeate whereas the wall of drum 13 (Fig. 3) is foraminated over its whole length i. e. provided with small, circumferentially directed slots. These openings or slots may be distributed over the whole circumference of the drum or over only part of it. They may easily be freed from kernels which may have stuck therein, by means of a brush contacting the outer surface of the rotating drum. To the walls of such drums, extended over their whole lengths, there are fixed, by welding or any other suitable means, helical conveyer members or blades, 14, 15, and 16, respectively.

The cylindrical drums 11, 12, 13 are provided at their charging ends with conical end pieces 21, 23, 25, respectively, open at their bases.

Similar cones may be provided at the discharge ends of the drums, as for instance shown at 24 and 26 of drums 12, 13, respectively. Such cones at the discharge ends, however, may be dispensed with.

A pulley 17, 18, 19, respectively, or other convenient or conventional driving element is provided at each of the drums, driven by a belt, or other drive, not shown, for rotating the drums about their axes.

The conical end pieces 21, 23, and 25 embrace, and thus are rotatably supported by, hollow sheet metal cones 29, 30, and 31, respectively. These cones 29, 30, and 31 extend lengthwise over the cones 21, 23, and 25, and are supported at these extensions by supports 34. Rollers 35 support the drums 11, 12, 13 rotatably. The supporting cones 29, 30, 31 further carry the feeding hoppers 36, 37, 38, respectively.

Figure 3:
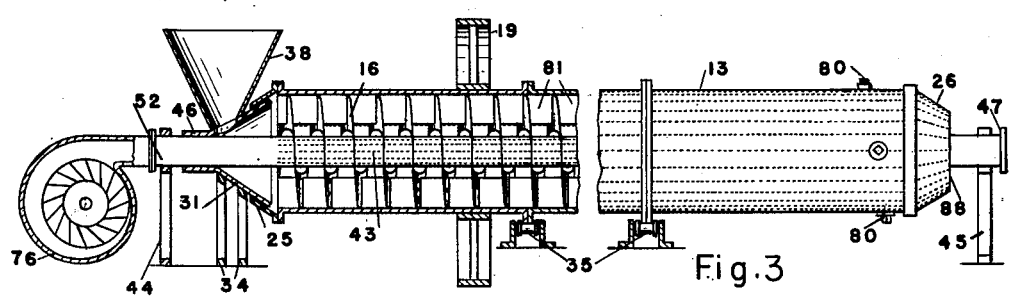
Fig. 3 is a longitudinal, more or less, diagrammatic section of a third station, an apparatus for the drying of the kernels after the wet treatment and steaming.
Figure 4:
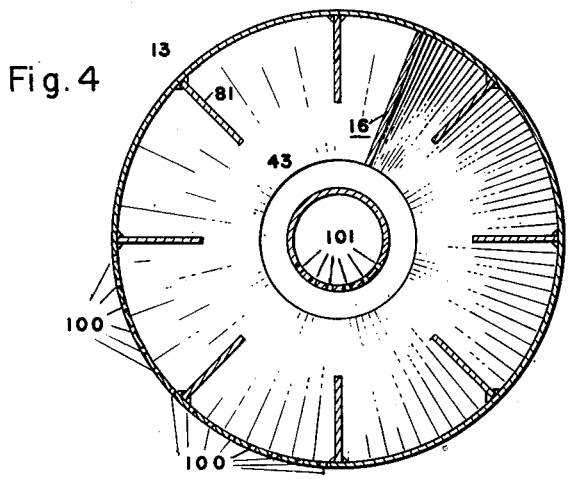
Fig. 4 is a cross section, on an enlarged scale relatively to Fig. 3, of a modification of the arrangement of the openings in the drying tube and in the drum.

Stationary central tubes 41, 42, 43, respectively, are disposed within the drums 11, 12, 13 and along the longitudinal axes thereof. The tubes are supported at both their ends by supports 44 and 45. Inside the drums, the tubes are foraminated as illustrated in the drawings, i. e. the tube 41 of the apparatus for spraying the rough rice is perforated at the lower side only, whereas the tube 42 (Fig. 2) of the apparatus for the steaming of the wet treated rice has its perforations restricted to the upper portion. Tube 43 may be foraminated over the whole circumference, as Fig. 3 illustrates. Otherwise, tube 43 may also be foraminated only in its lower part, Fig. 4, at 101. Fig. 4 also illustrates a modification of the drying drum where only part of the cylindric wall of the drum is foraminated, at 100. The drums, tubes and other parts may be of iron, or any other suitable metal or material.

The central tubes 41, 42, and 43 enter their respective drums 11, 12, and 13 through a neck 46 at the one end, the feeding end, and are closed at the other end, the discharge end, by a cap 47, for instance.

A feed line 60 with control valve 61 connects the open end 50 of tube 41 to a water supply line, a water tank 62, or other source of water supply. Similarly, a feed line 66, with control valve 67, supplies water from the same source 62, or another source of water supply, to the open end 51 of tube 42. Furthermore, steam is supplied, from a boiler 74 or other source of steam supply, to tubes 11 and 12 through feed lines 70, and 72 with control valves 71 and 73, respectively.

Tube 43 of drum 13 is connected at its open end 52 to a fan 76, or other source of heated air under pressure and of controllable temperature. Assuming otherwise equal dimensions of the three drums, for instance diameter 40 cm., length 800 cm., tube 42 will be of slightly larger diameter than tube 41, whilst tube 43 will be of still larger diameter, 10 cm., for instance.

The drums may be provided with draining openings 79 distributed over the circumference of the drums, such as indicated in the drawings. These openings are normally closed by a plug 80.

In the drums 12, 13, i. e. those within which the rice is to be steamed and thereafter dried, baffle plates 81 are provided, four for instance evenly distributed over the circumference of the drums. These baffle plates 81 are mounted on the inner walls of the drums and extended longitudinally over the whole lengths thereof. The turns of the helical conveyor blades are slotted for receiving within the slots the baffle plates. The space of the drums within the turns of the conveyor blades thus is subdivided, by means of the baffle plates, into compartments. By means of these baffle plates, the kernels of the rice, while being steamed or dried in the slowly revolving drum and moved along the drum by means of the conveyor blade, are alternatingly raised and then dropped from compartment to compartment by the baffle plates during the rotation of the drum.

No baffle plates are provided in drum 11 of Fig. 1, since the rough rice should permanently be kept in the hot water during its passage through and along drum 11 and the wet treatment.

The successive stages of the processing of the rice will now be described with reference to the apparatus illustrated.

*Wet treatment*

In the part of the installation, illustrated in Fig. 1, the rice in its natural state, or rough rice is partially or fully permeated or saturated with water, in the course of which operation the vitamins of the B-complex, chiefly present in the outer cells layers and in the germ, will diffuse towards the center and will thus become uniformly distributed throughout the kernel.

The rough rice to be treated is introduced into the hopper 36 and drops through the cone 29 into the rotating drum 11 wherein it is moved, by the helical conveyor blade, slowly and in a relatively thin layer uniformly to the discharge end of the drum.

Water is fed through pipe line 60 into the stationary foraminated tube 41 of drum 11, the water being heated to the desired temperature by means of the steam admitted through steam pipe 70 or may be heated separately and pumped into the drum through the perforated tube. The quantities of water and of steam are controlled and regulated by means of the control valves 61 and 72. When the drum is rotated, the rough rice is continuously moved by the helical conveyor blade 41.

The water continuously fed in slight excess of the quantity taken up by the rice is likewise conveyed by the conveyer blade through the apparatus. The level of the water may be held constant or may be varied at will by proper control of the quantity of hot water which is sprayed at the various parts over the length of tube 41. This may be effected through proper distribution over the length of tube 41 of the spray openings, through proper choice of their sizes and numbers dependent upon their specific place on the spraying tube, or their distance from the entrance of the drum and in accordance with the quantity of water with which the rice should be in contact at the various parts along drum 11.

The water will then flow out at the end 86 of drum 11 and may, if desired, be cleaned and returned to the process.

The accurate control of the wet process, i. e. the supervision of the temperature of the spray water and the degree of saturation of the kernels with water may be effected with the aid of thermometers and control tubes respectively. To this end, the rotating drum may be provided with a plurality of openings, distributed along a generatrix and at intervals of say 1 meter, in which openings, as for instance by means of a bored stopper, a corresponding number of thermometers are secured, which therefore rotate with the drum and in their upper position indicate the temperature of the air in the drum, whilst in their lower position such thermometers show the temperature of the water. Similarly the degree of saturation of the kernels may be supervised by attaching to the drum a series of glass tubes closed at the top and communicating with the interior of the drum, in such a manner that in their lower position, such tubes are filled with water and kernels, the transparency of the tubes permitting the operator to observe the color of the kernels which is a measure for the degree of saturation, since the kernels while taking up water, gradually become browner. These control means therefore show the product in all its stages during the rotation of the drum.

Alternatively, the control tubes may be readily removed from the drum and the water contents of the kernels quickly determined with an electric moist tester or in another manner known per se. The data thus obtained, determine whether the speed of rotation of the drum and the water supply should be increased or decreased.

The duration of the wet process depends upon the kind of rough rice to be treated and the temperature at which the water is kept. It is determined empirically. Suitable temperatures are between 75 and 95° C. The time period for treating the rice with water may be about 60 minutes if water of a temperature of 75° C. is used and will be shorter with water of a higher temperature, for instance approximately 30 minutes at a temperature of 95° C. The degree of saturation of the kernels may be ascertained with a moisture tester. The kernels of the rough rice will preferably not be permeated with water to the point of saturation in this stage of the process, since excessive swelling and cracking of the kernels may be more easily avoided during the subsequent steaming. The wet treated rice leaves the drum continuously at 86.

The water used for the wet process should not be alkaline in view of its adverse effect on the vitamin contents of the final product.

After use, the drum may be cleaned by closing the steam valve 72 and fully opening the water valve 61, tube 41 then acting as a water sprayer. One or more of the plugs 80 are then removed, so that all waste, leavings, and impurities are removed through the opening or openings 80 which should be wide enough, say have a diameter of 10 cm., for example.

Figure 2:
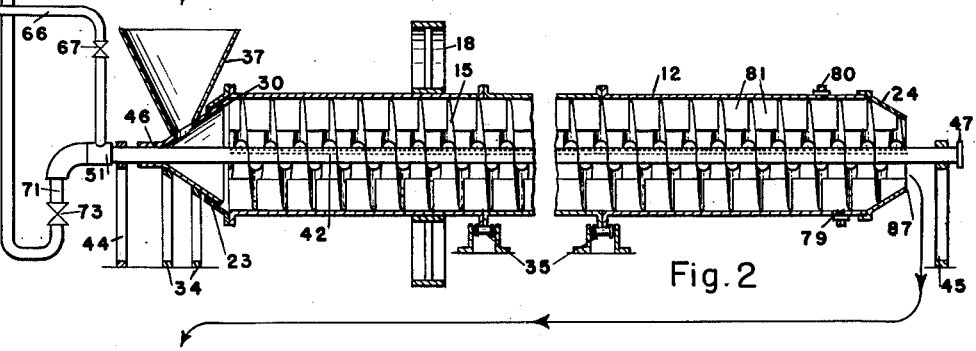

The wet treated rice at its discharge from the drum 11 may be collected in a bin, the water drained off from the rice, or the rice may be conveyed by any appropriate, convenient or conventional means, not shown on the drawings, to the hopper 37 of the steaming station, Fig. 2.

*Steaming*

The object of the steaming of the partially or fully saturated rice, the operation chiefly determining the nature of the product, is the complete gelatinization of the starch in the kernels of the rice, so that the vitamins are retained therein. Up to the present it has been this treatment in which the greatest difficulties have been involved, since it was impossible to check the temperature of the rice accurately and thus to carry out continuously a perfectly uniform treatment. The inventor has found that the requirement of checking the temperature throughout the whole mass of the rice to be steamed, can be met with by continuously moving the rice in a relatively thin layer within a dry or moist steam medium at atmospheric pressure and at a given constant temperature. The kernels of the rice are thus subjected to the steaming under identical conditions for all of them. A uniformly steamed perfect product is thus obtained.

In the method of this invention the operator may accurately check the temperature to which the individual kernels are subjected by means of thermometers in the manner described with reference to the wet treatment of the rough rice. Care may now easily be taken that in no part of the rice the desired critical temperature be exceeded. This is of essential importance in view of the insight gained that the preservation of the vitamins, more particularly the vitamin $B_1$ contents in the final product, depends upon the temperature which the water permeated kernels had reached during the steaming process. Up to the present, this important factor has not, or has not sufficiently, been taken into account. Moreover if, as with known processes, the rough rice is steamed under pressure, the temperature of the rice kernels may rise above 100° C. At this temperature, part of the vitamins will be destroyed, so that the vitamin contents of the steamed rice will become lower than that of the rough rice with which the process had been started.

The rice introduced in the revolving drum 12 through hopper 37 and cone 30, is continuously and alternatingly raised and dropped by the baffle plates 81 and simultaneously advanced by the helical conveying blade 15 and finally discharged at the end 87 of cone 24.

As the perforations of the tube 42 are restricted to the upper portion thereof, direct contact of the steam with the rice is avoided, which would otherwise cause unequal heating of the kernels. Owing to the arrangement of the perforations in the upper part of tube 42, the steam is directed to the upper portion of the rotating drum the rice thus being protected against the direct impact of the steam.

If during the treatment of the rice with hot water, the process had been so directed that the rice was permeated with moisture up to its point of saturation and steaming is at all necessary for completing the gelatinization process, care should be taken that the higher temperature of the dry steam which in this case is to be employed does not impair the vitamin contents of the rice. However, if the rice already is to be saturated in the wet phase of the process, the temperature in this wet phase may easily be so regulated that the gelatinization is completed with the saturating and the steaming may be dispensed with.

However, as a rule, the rice will be supplied to the steaming station saturated to a point below the saturation point. In the example given hereinabove, the rice will thus have taken up in the wet station 20% of its dry weight, that is half of the quantity of water which it is to take up to be saturated.

The steaming apparatus will thus be operated with saturated steam.

The steam directed to the upper portion of the rotating drum, will partly condense at the wall of the drum and the baffle plates. The rough rice will thus move through the moist atmosphere within the drum, and, in addition to heat, it will, since unsaturated, take up water from the condensate up to its saturation. The supply of heat will be so regulated that no condensation water is formed in excess of what the pre-permeated rough rice is still able to take up to its saturation.

The openings 79 of drum 12 might also be used, by removal of the plugs 80, for the continuous discharge of the steamed product. The steam is admitted through conduit 71 and so controlled by means of control valve 73 that no needless loss of steam occurs. If the full vitamin value is to be preserved, the temperature of the rice during the steaming process should not be raised above 100° C. The steamed rice will then at most have a temperature of 95° C. when leaving the apparatus after the steaming has been completed which takes about 15 minutes.

When certain types of rough rice are to be treated which do not withstand this temperature, since at that temperature they are liable to burst from the hulls and become practically boiled, drum 11 may be revolved more rapidly and in this way the temperature reduced, to 80° C. for example, and kept at this value. Once the critical temperature for a given type of rough rice is known, the process can be controlled perfectly and accurately, and the conditions under which the treatment is carried out controlled by means of the control valves 67 and 73 and the velocity of the rotation of drum 11. The degree of gelatinization of the starch in the kernels may be easily and accurately checked by using control tubes as in the station for the wet treatment of the rough rice.

The steamed rice discharged from drum 12 will then be fed into the hopper 38 of the drying station, Fig. 3.

Drying

The drying of the parboiled rice should be carried out very carefully, the temperature and the condition of the rice checked by means of thermometers and control tubes, as hereinbefore described, since, when the rice is heated too rapidly or at too high a temperature, a temperature of the rice kernels even as low as 45° C., may cause cracks in the rice kernels. These cracks, when thereafter the rough rice is hulled to serve as finished rice for distribution and sale, may cause a high percentage of broken kernels. These cracks will be avoided if the steamed kernels of the rice are moved slowly and continuously in a thin layer in an air current at substantially atmospheric pressure and of constant and moderate temperature not exceeding for instance 80° C.

The critical limits of the temperature of the drying air are ascertained empirically. The temperatures depend upon the specific type or variety of rice to be treated, i. e. the temperatures are different for rice with long kernels and rice with short kernels.

The drying process is carried out in the apparatus illustrated in Fig. 3 or 4. The perforated or foraminated tube 43 is connected at its free end to a fan 76 adapted to supply heated air. This heated air passes through the openings of tube 43 into the rotating drum 13, enters the space between the turns of the helical conveying blade 16, and finally leaves the drum through its wall which to this purpose is foraminated. The steamed rice fed to the helical conveying blade 16 through hopper 38 and cone 31, is slowly moved in a thin layer through a permanently flowing air current of constant temperature supplied by the fan. The kernels are raised by the baffle plates 81 and then dropped while turning around, are thus dispersed and separated from one another and subjected from all sides to the drying air. The capacity of the fan is so chosen that the water vapor liberated from the kernels will be discharged completely along a short path, viz. along the distance between the layer of rice and the top of the rotating drum 13.

In the embodiment of Fig. 4 where tube 43 is perforated only in the lower part of its circumference, as indicated at 101, and drum 13 only in a part of its circumference, as indicated at 100—the size of the openings and the thicknesses of the walls being shown, for the purpose of better illustration only, on an enlarged and exaggerated scale relatively to the diameters of the tube and the drum—the drying air will be directed against the rice which always assembles in the spaces between the baffle plates 81, whichever at the time are in their lower positions. The openings 100 in the wall of drum 13 will alternatingly, as ever they revolve through the lower part or the upper part of their circular path, permit escape of the humid atmosphere only after it had passed through the layer of rice, or the openings, as they revolve through the upper part of their path, will allow ventilation of the drying space into which the grains of the rice had relinquished their water contents as vapor. During all this time, the grains of the rice, spread in a thin layer, are slowly advanced and simultaneously rolled and tumbled about one another. The surfaces of the individual grains thus are uniformly and permanently exposed to the direct contact with the drying air.

Highly effective drying is thus achieved.

The dried parboiled rice leaves the apparatus at the discharge end 88 or may be discharged through openings 79.

I claim:

1. In processing rough rice, the method of preserving the vitamin contents of the rice which includes the steps of rendering and maintaining the surfaces of the rice grains readily and uniformly accessible to treatment, by spreading the rough rice in a thin layer and imparting to the grains a slowly progressing and rolling motion, conveying into and diffusing within the kernels of the rice the vitamins contained in the silver-coat, the outer cell layers, and the germs thereof, by causing water to permeate gradually the kernels up to the saturation point thereof while keeping the quantity of water supplied in any fluid condition to the process at most in slight excess of the quantity taken up by the kernels thereby avoiding any escape of liquid water and with the water of any vitamins out of the kernels; fixing the vitamins diffused in the kernels by gelatinizing the starch in the kernels under moderate conditions of temperature and pressure; and drying thereon the rice at substantially atmospheric pressure and moderate temperature.

2. In processing rough rice, the method of preserving the vitamin contents of the rice which includes the steps of rendering and maintaining the surfaces of the rice grains readily and uniformly accessible to treatment, by spreading the rough rice in a thin layer and imparting to the grains a slowly progressing and rolling motion, conveying into and diffusing within the kernels of the rice the vitamins contained in the silver-coat, the outer cell layers, and the germs thereof by spraying the layer with water of elevated temperature but not reaching 100° C. and causing water to permeate gradually the kernels until the kernels have taken up a quantity of water below the saturation point of the kernels, while keeping the quantity of water supplied to the layer at most in slight excess of the quantity taken up by the kernels thereby avoiding any escape of water and with the water of any vitamins out of the kernels; simultaneously, through the action of the heat of the water, starting to fix the vitamins diffused in the kernels by starting gelatinization of the starch in the kernels; completing saturation of the rice kernels and gelatinization of the starch therein by conveying the rice in thinly spread condition through a steam atmosphere at a pressure not substantially surpassing and not substantially below atmospheric pressure and at a temperature near but not exceeding 100° C., without, however, subjecting the grains to the direct impact of the steam; allowing the steam in said atmosphere to condense and the condensate to contact the rice thus causing further permeation of the kernels with moisture until the saturation point of the kernels is reached whilst simultaneously gelatinization of the starch in the kernels is completed; the supply of heat with the steam being so regulated that no condensation water is formed substantially in excess of that taken up by the kernels; and thereon drying the rice at substantially atmospheric pressure and moderate temperature.

3. The method as set forth in claim 2 wherein the rice is permeated up to its saturation with approximately equal quantities of moisture in two steps, approximately half in the spraying step and half in the steaming step.

4. In processing rough rice, the method of preserving the vitamin contents of the rice which includes the steps of rendering and maintaining the surfaces of the rice grains readily and uniformly accessible to treatment, by spreading the rough rice in a thin layer and imparting to the grains a slowly progressing and rolling motion, conveying into and diffusing within the kernels of the rice the vitamins contained in the silver-coat, the outer cell layers, and the germs of the rice, by spraying the layer with water of elevated temperature and causing water to permeate gradually the kernels up to the saturation point thereof while keeping the quantity of water applied to the layer at most in slight excess of quantity taken up by the kernels thereby avoiding any escape of water and with the water of any vitamins out of the kernels; simultaneously, fixing the vitamins diffused in the kernels by regulating the temperature of the water so as to gelatinize the starch in the kernels; and thereon drying the rice at substantially atmospheric pressure and moderate temperature.

5. In processing rough rice, the method of preserving the vitamin contents of the rice which includes the steps of rendering and maintaining the surfaces of the rice grains readily and uniformly accessible to treatment, by spreading the rough rice in a thin layer and imparting to the grains a slowly progressing and rolling motion, conveying into and diffusing within the kernels of the rice the vitamins contained in the silver-coat, the outer cell layers, and the germs of the rice by conveying the rice through a steam atmosphere at a pressure not substantially surpassing and not substantially below atmospheric pressure and at a temperature near but not exceeding 100° C., without, however, subjecting the grains to the direct impact of the steam while allowing the steam in that atmosphere to condense and the rice to contact the condensate, thus causing permeation of the kernels of the rice with moisture until the saturation point of the kernels is reached and simultaneously fixing the vitamins diffused in the kernels by gelatinizing the starch in the kernels; the supply of heat with the steam being so regulated that no condensation water is formed substantially in excess of that taken up by the kernels; and drying thereon the rice at substantialy atmospheric pressure and moderate temperature.

D. S. FERNANDES.

REFERENCES CITED

The following references are of record in the file of this patent:

UNITED STATES PATENTS

| Number | Name | Date |
|---|---|---|
| 1,239,555 | Baumgartner | Sept. 11, 1917 |
| 2,358,251 | Huzenlaub et al. | Sept. 12, 1944 |
| 2,438,939 | Ozai-Durrani | Apr. 6, 1948 |